(12) United States Patent
Mahn, Jr. et al.

(10) Patent No.: US 6,361,855 B2
(45) Date of Patent: *Mar. 26, 2002

(54) METHOD OF FORMING HEAT ACTIVATED TRANSFER FOR IMPROVED ADHESION AND REDUCED BLEEDTHROUGH

(75) Inventors: John Mahn, Jr., Cincinnati; John Mahn, Sr., Hamilton, both of OH (US)

(73) Assignee: Specialty Adhesive Film Co., Cleves, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/431,720

(22) Filed: Oct. 28, 1999

(51) Int. Cl.$^7$ .................................................. B32B 3/00
(52) U.S. Cl. ..................... 428/200; 4285/347; 4285/913
(58) Field of Search ................................ 428/347, 913, 428/480, 425, 515, 190, 206, 200, 914, 195

(56) References Cited

U.S. PATENT DOCUMENTS

| 3,660,212 | A |   | 5/1972  | Liebe, Jr.       |
|-----------|---|---|---------|------------------|
| 4,069,081 | A |   | 1/1978  | Drower et al.    |
| 4,269,885 | A | * | 5/1981  | Mahn ........... 428/216 |
| 4,302,495 | A |   | 11/1981 | Marra            |
| 4,533,592 | A |   | 8/1985  | Bingham          |
| 4,548,857 | A |   | 10/1985 | Galante          |
| 4,610,904 | A |   | 9/1986  | Mahn             |
| 4,755,246 | A |   | 7/1988  | Monia            |
| 4,786,349 | A |   | 11/1988 | Mahn             |
| 4,971,644 | A |   | 11/1990 | Mahn             |
| 5,338,603 | A |   | 8/1994  | Mahn             |
| 5,480,506 | A |   | 1/1996  | Mahn             |
| 5,635,001 | A |   | 6/1997  | Mahn             |

* cited by examiner

*Primary Examiner*—Merrick Dixon
(74) *Attorney, Agent, or Firm*—Wood, Herron & Evans, LL

(57) ABSTRACT

A laminate suitable for formation of athletic lettering and other decoratives which has improved adhesion and reduced curling is formed by forming a laminate from a pigmented polyurethane and a polyester adhesive layer. Either the individual lamina prior to lamination, or the formed laminate are annealed for 1 to 100 hours at a temperature from 100° to 250° F. to relieve stress and prevent curling. Preferably, the polyurethane layer does not include any external lubricants and has a high durometer which, in turn, permits formation of letters on letters without bleedthrough and with improved adhesion.

14 Claims, 1 Drawing Sheet

METHOD OF FORMING HEAT ACTIVATED TRANSFER FOR IMPROVED ADHESION AND REDUCED BLEEDTHROUGH

BACKGROUND OF THE INVENTION

Heat Activated Transfers are used for a variety of different applications, including providing ornamental indicia on garments, providing lettering on sports jerseys, and providing identification on other types of cloth and materials. Although formed from a variety of different materials, they are generally laminates with a lower adhesive layer and an upper pigmented layer which provides the indicia. There are other substitute products and methods such as screen printing wherein a pigmented, polymeric material is printed directly onto a substrate and cured.

One very successful heat-activated transfer laminate is disclosed in Mahn U.S. Pat. No. 4,269,885. This product is a laminate with a lower polyester adhesive layer and an upper pigmented polyurethane or polyether layer. One of the problems with laminates such as this is that over time, and during application in particular, they tend to curl. The curling makes it more difficult to apply these uniformly.

The invention disclosed in the Mahn '885 patent overcame this problem by forming a laminate where the upper and lower lamina had a compatible or similar coefficient of thermal expansion. Thus, upon heating, both layers reacted in the same manner which reduced or prevented curl. In order to achieve this, the upper and lower layers must be carefully matched.

However, it is frequently desirable to modify the characteristics of either the polyester or the polyurethane layer. For example, if one were to apply a letter on a letter one slightly smaller than the other with contrasting colors, one would need to adhere the polyester layer of the upper letter to the polyurethane layer of the lower letter (which is adhered to the cloth substrate). The product disclosed in the Mahn '885 patent does function in this manner, but has some problems. The upper layer generally will include an external lubricant which, over time, will bloom and interfere with the adhesion between the upper letter and the lower letter. Further, functionally the product tends to be very soft. If the lower letter is very dark, it tends to bleed through the upper letter, presenting an unpleasant appearance.

The bleedthrough could be solved by simply changing the durometer of the pigmented layer. But when this is done, it is extremely difficult to match the adhesive layer to the pigmented layer to prevent curling. Likewise, the external lubricant can be removed. But again, this change makes it extremely difficult to match the adhesive layer to the pigmented layer, again resulting in curling.

SUMMARY OF THE INVENTION

The present invention is a method of making a non-curling, pigmented laminate by forming the individual lamina and subsequently heating them to relieve all stress that has been created during the formation of the laminate. The heat treatment can be provided after the lamination is formed, or provided individually to both the adhesive layer and the pigmented layer prior to lamination. This enables one to vary the durometer, melt point and orientation of the pigmented layer in particular without resulting curling. This, in turn, allows one to form a letter on a letter without bleedthrough. Further, it allows one to eliminate the external lubricant, if desired replacing it with an internal lubricant. This improves adhesion of a letter on a letter and again, prevents curling.

Overall, this eliminates the need to match the coefficient of thermal expansion of the two layers, thus making it much easier to formulate the end product, and allowing end products having desired characteristics such as durometer, melt point and compatibility and the like without curling.

The objects and advantages of the present invention will be further appreciated in light of the following detailed description and drawings in which:

DETAILED DESCRIPTION

Figure 1:
FIG. 1 is a cross-sectional view of a laminate formed according to the present invention.

The present invention is a pigmented laminate which is adapted to be used to provide ornamentation to, in particular, cloth substrates such as clothing and the like. The laminate 11 includes two layers. The first lamina is a thermoplastic or thermoactive adhesive layer 12, and the second lamina is a thermoplastic pigmented layer 13. As indicated below, these two layers are laminated together with heat and pressure to form the laminate 11.

More particularly, the adhesive layer 12 can be a wide variety of different adhesives or blends of adhesives such as polyester thermoplastic adhesives, polyurethane thermoplastic adhesives including polyurethane polyesters and polyurethane polyethers, as well as unsaturated polyester having a heat-activated curing agent such as a blocked isocyanate. Generally, the preferred adhesive is a polyester thermoplastic adhesive. One such polyester adhesive that is particularly useful in the present invention is sold by Bostik as product number 4117. This has a melting point of about 280° F. A blocked isocyanate/uncured linear polyester adhesive is also sold by Bostik under the brand designated 10-300-3. This is further described in U.S. Pat. No. 5,338,603, which is incorporated herein by reference.

Generally, the thickness of the thermoplastic layer can vary depending upon the particular application. It may be from about 1 to about 5 mils thick. Preferably, the melting point of the adhesive will be 230–300° F. to facilitate application. The particular adhesive should have a medium hardness and be able to adhere to a wide range of cloth substrates.

The adhesive layer 12 can be formed by any method. Generally, pellets of the thermoplastic adhesive are melted and the film extruded onto a silicone-coated carrier sheet (not shown). This can then be cooled as disclosed in Mahn U.S. Pat. No. 4,269,885, the disclosure of which is hereby incorporated by reference. This is then formed into a roll. The adhesive layer can also be pigmented to reduce the likelihood of bleedthrough. The Bostik 10-300-3 adhesive can be purchased as a film.

The pigmented layer 13 can be formed from a wide variety of thermoplastic materials such as polyurethanes, both polyester- and polyether-type polyurethanes and thermoplastic elastomers. These are generally purchased as pellets and formulated with pigment and other internal or external lubricants. Two preferred resins are B F Goodrich Estane #58277 and Morton Int'l Morthane L425.77D. Generally, again, pellets of the thermoplastic base material are purchased having desired physical characteristics. One characteristic which is significant for use in the present invention is the durometer. Preferably, the durometer of the pigmented layer will be 80 to 95 shore A with 91 preferred. The durometer may be increased as a high melting point adhesion is employed.

In a preferred embodiment, pigmented layer 13 should have no external lubricant. However, it can include an internal lubricant such as zinc stearate.

Preferably, it will have a melting point greater than 300° F., preferably about 310° F. The color load of the pigmented layer can vary, depending upon the color formed, as well as the pigment employed. Generally, the color load will be 10% to 18% with generally about 14% preferred.

The amount of internal lubricant utilized can vary widely, depending on the particular lubricant. However, with zinc stearate about 4% internal lubricant is adequate. Generally, the elongation of the pigmented layer will be about 5% to 18%. As stated, these are formulated, melted and the polyurethane is extruded and formed on a blown film line. Blown films are always stretched or oriented. However, low orientation is preferred over high orientation. The adhesive layer is generally not oriented which is part of the curling problem.

The individual films are either heated to release stress—in other words, annealed—or are first laminated together and subsequently annealed. The lamination is conducted by applying heat and pressure to the individual lamina, forcing them to bond together. Heat and pressure are applied by a nip roller heated to 330° F. and with an applied pressure of 80 to 150 psi. This should heat the laminae to a temperature above the softening point of the pigmented layer but below its melting point.

The formed laminate may be allowed to cool and is rolled and stored. Either the individual pigmented layer and adhesive layer, or more preferably the formed laminate, are subjected to an annealing process in which the laminate or the individual layers are heated for a time and temperature effective to release the stress in the films to enable the formed laminate to be stored and used without curling. Entire rolls of the individual lamina or laminate can be annealed. The annealing temperature should be less than the melting point of the adhesive and can be generally from 100 to about 280° F., preferably about 150° F. to 250° F. The duration will be generally from about 1 hour to about 72–100 hours or more. This will vary, depending upon the components of the product and how they are formed, i.e., the amount of stress placed upon them during the formation. Where the polyurethane has a higher melting point and harder durometer, the temperature and time will be increased. If the temperature is decreased, the duration of the annealing is increased.

Alternately, the laminate when formed may be cooled only to the annealing temperature and then maintained at that temperature until sufficient tension is relieved and annealing is complete.

Letters or other indicia are cut out from the formed laminate 11. These are applied to cloth and other substance with heat and pressure effective to melt the adhesive layer. Upon cooling, the adhesive layer tightly adheres to the cloth substrate, binding the indicia to the substrate.

Figure 2:
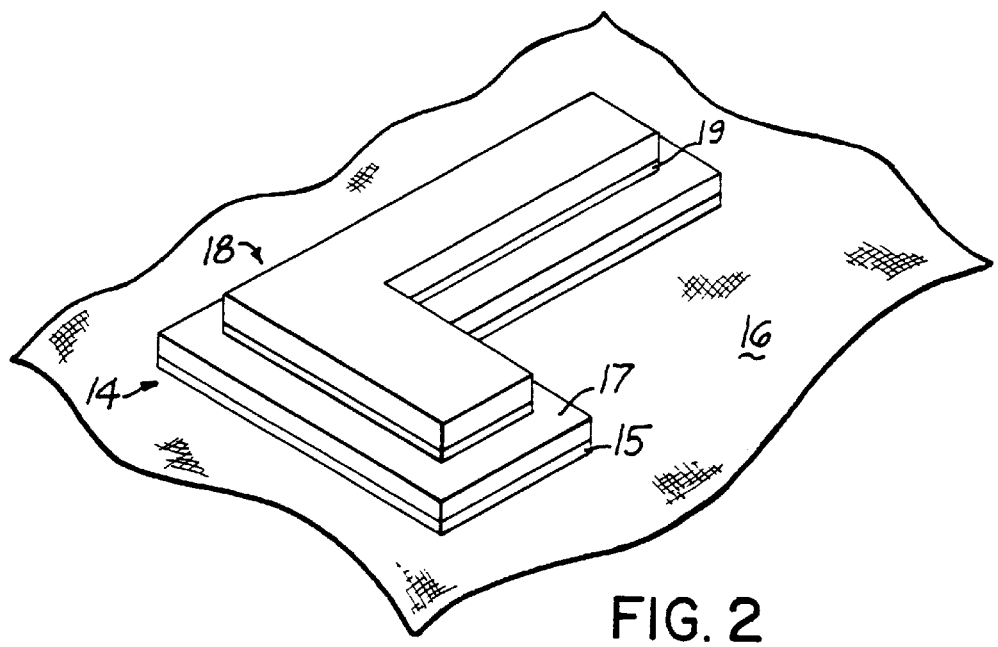
FIG. 2 is a perspective view of a first letter adhered to a second letter.

As shown in FIG. 2, a letter on a letter can easily be formed. The letters 14 and 18 (which would generally be different colors) are cut from the laminate, as discussed above, which has been annealed, as discussed above. In this embodiment, the first letter 14 is applied to the cloth substrate with heat and pressure effective to cause the thermoplastic adhesive layer 15 to bond to the cloth substrate 16, adhering the pigmented upper layer 17 to the cloth substrate. A second smaller letter 18 is then applied to the first letter 14. The thermoplastic layer 19 of letter 18 is placed on the pigmented layer 17 of the first letter 14. Heat and pressure are applied to cause the thermoplastic adhesive layer 19 to bond to the pigmented layer 17 of the first letter 14. Upon cooling, this will bond the first letter to the second letter, providing the letter-on-letter appearance. By controlling the durometer of the pigmented layer, bleedthrough is prevented. Because the pigmented layer of the lower letter is made without external lubricants, the second letter will strongly adhere to the first letter. Finally, this product, because of the method of forming, will not curl and has relatively unlimited shelf life.

This has been a description of the present invention along with preferred method of practicing the invention currently known to the inventors. However, the invention itself should only be defined by the appended claims wherein we claim:

1. A non-curling laminate suitable for use in athletic lettering formed by thermoplastically bonding a pigmented thermoplastic film having a first melting temperature to a thermoplastic adhesive layer having a second melting temperature wherein said laminate is maintained at a temperature of at least 100° F. and less than said first and second melting temperatures for a period of time effective to form said non-curling laminate said period of time being at least one hour.

2. The non-curling laminate claimed in claim 1 wherein said pigmented film is a blown film.

3. The non-curling laminate claimed in claim 1 wherein said pigmented film is substantially free of external lubricants.

4. The non-curling laminate claimed in claim 1 wherein said pigmented film is a polyurethane layer.

5. The non-curling laminate claimed in claim 4 wherein said polyurethane layer is substantially free of external lubricants and further includes an internal lubricant.

6. The non-curling laminate claimed in claim 4 wherein said polyurethane layer has a gerometer of at least about 88.

7. The non-curling laminate claimed in claim 1 wherein said adhesive layer is pigmented.

8. The non-curling laminate claimed in claim 1 wherein said laminate is maintained at a temperature of 100° to about 280° F. from one to 100 hours.

9. A pigmented laminate having a pigmented layer and a thermoplastic adhesive layer bonded together, said pigmented layer substantially void of external lubricants, wherein said pigmented layer is a thermoplastic polymeric film which has been heated for a combined time and temperature effective to release stress in said pigmented layer to prevent curling of said formed laminate.

10. The pigmented laminate claimed in claim 9 wherein said pigmented layer is a blown film.

11. The pigmented laminate claimed in claim 9 wherein said pigmented layer is a polyurethane layer.

12. The pigmented laminate claimed in claim 9 wherein said polyurethane layer further includes internal lubricants.

13. The pigmented laminate claimed in claim 9 wherein said effective time and temperature comprises a temperature of about 100° F. to about 250° F. and said time is from one hour to about 100 hours.

14. A thermoplastic pigmented letter comprising a first letter formed from the laminate claimed in claim 3 wherein said letter has an external diameter and a second layer bonded to said pigmented film of said first letter, said second letter having an external size less than the external size of said first letter.

* * * * *

UNITED STATES PATENT AND TRADEMARK OFFICE
CERTIFICATE OF CORRECTION

PATENT NO.   : 6,361,855 B2
DATED        : March 26, 2002
INVENTOR(S)  : John Mahn, Jr. and John Mahn, Sr.

It is certified that error appears in the above-identified patent and that said Letters Patent is hereby corrected as shown below:

Column 1,
Line 57, reads "formation of the laminate." should be -- formation of the laminae. --

Column 4,
Line 38, reads "said polyurethane layer has a gerometer of at least about 88" should be -- said polyurethane layer has a durometer of at least about 88 --.

Signed and Sealed this

Twenty-fourth Day of September, 2002

*Attest:*

*Attesting Officer*

JAMES E. ROGAN
*Director of the United States Patent and Trademark Office*